United States Patent [19]
Kiriyama

[11] Patent Number: 5,853,176
[45] Date of Patent: Dec. 29, 1998

[54] VACUUM CHAMBER AND METHOD OF MANUFACTURING THE VACUUM CHAMBER

[75] Inventor: Kenji Kiriyama, Yamanashi-ken, Japan

[73] Assignee: Tokyo Electron Limited, Japan

[21] Appl. No.: 791,285

[22] Filed: Jan. 30, 1997

[30] Foreign Application Priority Data

Feb. 6, 1996 [JP] Japan .................................... 8-044287

[51] Int. Cl.[6] ................................................. B65D 53/00
[52] U.S. Cl. ........................ 277/312; 220/681; 277/637; 277/905
[58] Field of Search ................................... 220/361, 677, 220/900, 680, 681; 277/312, 315, 316, 630, 637, 905, 921; 49/479.1, 498.1

[56] References Cited

U.S. PATENT DOCUMENTS

| | | | |
|---|---|---|---|
| 2,859,812 | 11/1958 | Swanson | 220/900 X |
| 2,861,712 | 11/1958 | Bermingham | 277/630 X |
| 3,955,702 | 5/1976 | Lundy | 220/681 X |
| 4,315,390 | 2/1982 | Schaafsma | 52/255 X |
| 4,722,153 | 2/1988 | Hardy | 52/255 |
| 5,086,598 | 2/1992 | Weldy | 52/717.05 X |
| 5,676,757 | 10/1997 | Ikeda et al. | 220/681 X |

FOREIGN PATENT DOCUMENTS 750994  6/1956  United Kingdom ................... 220/681

*Primary Examiner*—Eric K. Nicholson
*Assistant Examiner*—Greg Binda
*Attorney, Agent, or Firm*—Graham & James LLP

[57] ABSTRACT

A vacuum chamber according to the present invention has a plurality of plates arranged to be joined together by using bolts to form an internal space, a sealing member continuously disposed along joint lines on the inside portion of the vacuum chamber facing the internal space in order to seal joint portions among the plates, and pressing members secured to the plates by bolts so as to hermetically press the sealing member against the joint portions among the plates.

11 Claims, 6 Drawing Sheets

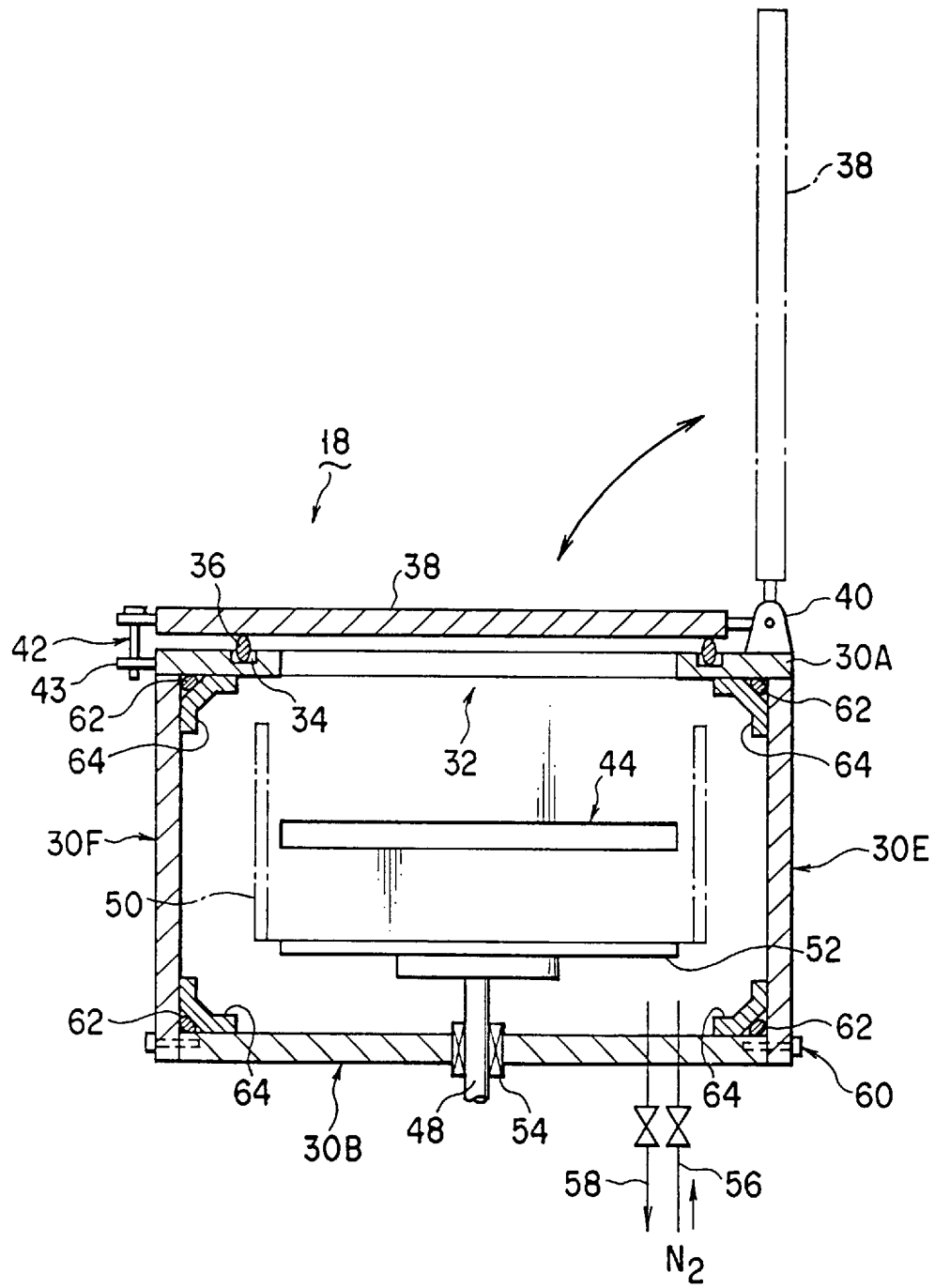
F I G. 2

VACUUM CHAMBER AND METHOD OF MANUFACTURING THE VACUUM CHAMBER

BACKGROUND OF THE INVENTION

The present invention relates to a vacuum chamber connected to a process chamber or the like in which, for example, liquid crystal display substrates or semiconductor wafers are processed, and to a method of manufacturing the vacuum chamber.

When a process chamber is used to subject semiconductor wafers or liquid crystal display substrates to a film forming process or an etching process, breakage of a predetermined vacuum state in the process chamber occurring when the objects are introduced into the process chamber and the same are discharged from the same has been prevented by introducing and discharging the objects to and from the process chamber through one or more vacuum chambers. In this case, the process chamber and the vacuum chambers are directly or indirectly connected to one another through gate valves, which can be opened and closed in such a manner that the communication among the chambers can arbitrarily be held and interrupted.

A processing apparatus which must have a high degree of vacuum comprises, for example, at least one cassette chamber (a vacuum chamber) to and from which a cassette accommodating a plurality of objects is introduced and discharged; a first arm chamber (a vacuum chamber) connected to the cassette chamber through a gate valve in such a manner that the communication can arbitrarily be held and interrupted and provided with a conveyance arm for holding and conveying the object; a load lock chamber (a vacuum chamber) connected to the first arm chamber through a gate valve in such a manner that the communication can arbitrarily be held and interrupted; a second arm chamber (a vacuum chamber) connected to the lock chamber through a gate valve in such a manner that the communication can arbitrarily be held and interrupted and provided with a conveyance arm for holding and conveying the object; and at least one process chamber connected to the second arm chamber through a gate valve in such a manner that the communication can arbitrarily be held and interrupted.

In a processing apparatus of the foregoing type, the gate valve capable of holding and interrupting the communication between the cassette chamber and the first arm chamber is closed, and then a cassette accommodating a plurality of objects is, in the closed state, introduced into the cassette chamber from outside. Since the cassette chamber is, at this time, exposed to the atmosphere, the vacuum state in the cassette chamber is broken. Accordingly, gas in the cassette chamber, the vacuum state of which has been broken, is exhausted to lower the pressure to realize a predetermined degree of vacuum. Then, the gate valve between the cassette chamber and the first arm chamber is opened so that the objects on the cassette are discharged from the cassette chamber by the conveyance arm in the first arm chamber, the degree of vacuum of which has been maintained at a predetermined level. Then, the objects are, by the conveyance arm and through the gate valve between the first arm chamber and the load lock chamber, introduced into the load lock chamber, the degree of vacuum of which has been maintained at a vacuum state. The objects in the load lock chamber are, by the conveyance arm in the second arm chamber, introduced into the process chamber, the degree of vacuum of which has been maintained at a vacuum state. That is, the vacuum state in each chamber is not broken when the objects are moved to the process chamber.

In a case where rectangular liquid crystal display substrates having a relatively large size of, for example, 550 mm×650 mm, are processed in the process chamber, the size of each of the vacuum chambers is enlarged. A cassette chamber capable of accommodating, for example, twenty substrates is formed into a large and box-like vacuum chamber which has size of about 1 m×1.5 m×0.7 m and weighs several tons. The arm chamber, load lock chamber and the cassette chamber must have sufficient durability against atmosphere and excellent hermetic sealing performance. However, required durability and sealing performance cannot easily be obtained if the vacuum chamber has large size.

In order to cause the vacuum chamber to have required durability and the sealing performance, plates forming the chamber have been elaborately welded to one another, as shown in FIG. 9. That is, the vacuum chamber 2 having a box-like shape is, as illustrated, formed by welding six plates 4A to 4F which are stainless steel plates or aluminum plates. In this case, the vacuum chamber 2 is caused to have the sufficient strength against vacuum by performing intermittent and deep partial welding 8 along the outer joint lines among the plates 4A to 4F. To obtain sealing performance, shallow light welding (not shown) is performed along the inner joint lines among the plates 4A to 4F. Each of a pair of opposite plates 4C and 4E has a rectangular insertion hole 6 through which the object, such as the liquid crystal display substrate, is allowed to pass.

When the plates 4A to 4F are welded to one another by welding, the plates 4A to 4F are inevitably deformed with welding heat. Accordingly, a top board 4A and the like are finally joined, the joining surfaces of the top board 4A and the like must be mechanically cut prior to welding the final portions so as to obtain a satisfactory horizontal level. Since great thermal deformation takes place in the case where the plates 4A to 4F have a large size in meter units, the operation for obtaining the horizontal level must be performed without exception. Therefore, additional manufacturing steps must be performed and the manufacturing cost cannot be reduced. Since the welding operation and the grinding operation generally are performed in different places, a heavy structure having a weight of several tons must be transported to the respective places and, therefore, the transportation operation causes the cost to be enlarged.

If a partial damage is found in one of the plates 4A to 4F or leak attributable to partial deformation or the like of one of the plates 4A to 4F is detected after the chamber has been manufactured, one cannot only change the defective plate because the overall body of the chamber has been manufactured by welding. Therefore, if things come to the worst, the chamber is abolished. Although it might be considered feasible to decompose the welded portions to repair the defective plate, the plate is deformed excessively because of the welding process and the process for decomposing welding portions. Therefore, a chamber for another purpose cannot be manufactured by changing the specific plate.

Since internal structure parts are attached to the bottom plate 4B of the chamber, a greater load is applied to the bottom plate 4B as compared with the other plates 4A, 4C to 4E or 4F. Therefore, it is preferable that the bottom plate 4B is made of a material, such as stainless steel, having strength capable of preventing deformation. On the other hand, it is preferable that the other plates 4A, 4C to 4E or 4F are made of aluminum having light weight because they are not required to have considerable strength. However, materials of different types cannot easily be welded to each other while maintaining satisfactory sealing performance.

BRIEF SUMMARY OF THE INVENTION

An object of the present invention is to provide a vacuum chamber which is capable of maintaining satisfactory sealing performance without employing welding, and to a method of manufacturing the same.

The object of the present invention can be achieved by the following vacuum chamber and a method of manufacturing the same. That is, according to one aspect of the present invention, there is provided a vacuum chamber comprising: a plurality of plates arranged to be joined together by using bolts to form an internal space; a sealing member continuously disposed along joint lines on the inside portion of the vacuum chamber facing the internal space in order to seal joint portions among the plates; and pressing members secured to the plates by bolts so as to hermetically press the sealing member against the joint portions among the plates. The chamber can be manufactured by the following method which comprises the steps of: joining a plurality of plates by using bolts to form a chamber having an internal space; continuously disposing a sealing member along inner joint lines facing the internal space in order to seal joint portions among the plates; and securing the pressing member against the plates by bolts to cause the pressing member to press the sealing member against the joint portions among the plates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a cross sectional view showing a load lock chamber (a vacuum chamber) forming the cluster tool apparatus shown in FIG. 1;

DETAILED DESCRIPTION OF THE INVENTION

Figure 1:
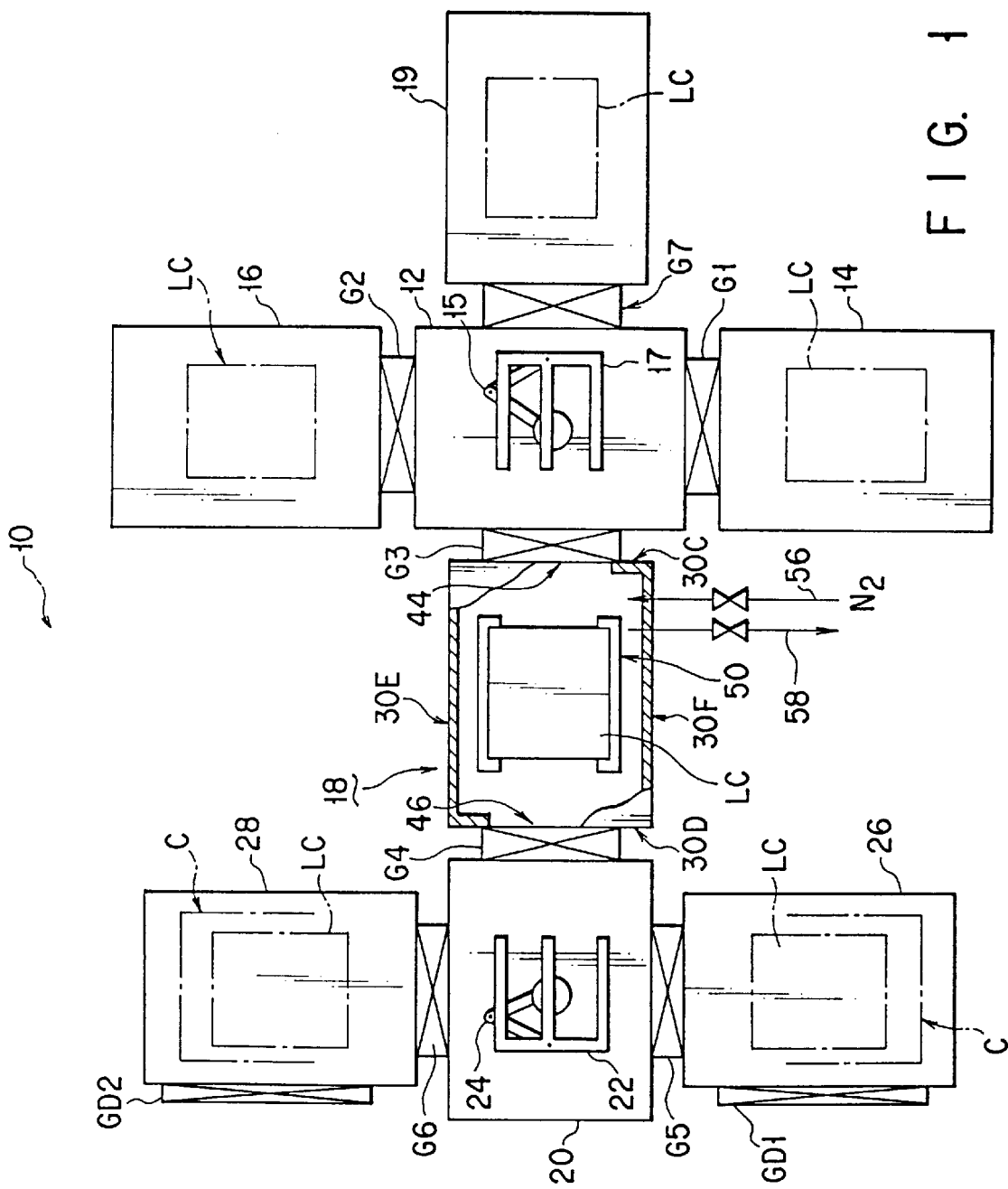
FIG. 1 is a plan view schematically showing a cluster tool apparatus having a vacuum chamber according to an embodiment of the present invention.

Referring to the drawings, an embodiment of the present invention will now be described.

FIG. 1 shows a cluster tool apparatus 10 having a vacuum chamber according to an embodiment of the present invention. As shown in FIG. 1, the cluster tool apparatus 10 has a first arm chamber 12 serving as the vacuum chamber. Three process chambers 14, 16 and 19 are connected to the first arm chamber 12 through gate valves G1, G2 and G7. In the process chambers 14, 16 and 19, liquid crystal display substrates LC having a relatively large size, for example, 550 mm×650 mm, are subjected to a predetermined process, such as a film forming process or an etching process. As a matter of course, a processing gas supply system (not shown) for supplying processing gas into each of the process chambers 14, 16 and 19 and a gas exhaust system (not shown) for exhausting gas in each of the process chambers 14, 16 and 19 to realize a predetermined degree of vacuum are connected to each of the process chambers 14, 16 and 19.

To enable the substrates LC to be introduced and discharged to and from the process chambers 14, 16 and 19, the first arm chamber 12 includes a conveyance arm 15 which is capable of expanding, contracting and swinging in the horizontal direction. A fork 17 for holding the substrates LC is attached to the leading end of the conveyance arm 15. As a matter of course, a gas supply system (not shown) for supplying inert gas, such as $N_2$ gas, into the first arm chamber 12 and a gas exhaust system (not shown) for exhausting gas in the first arm chamber 12 to reduce the pressure level in the first arm chamber 12 are connected to the first arm chamber 12.

A load lock chamber 18 serving as the vacuum chamber is connected to the first arm chamber 12 through a gate valve G3. A second arm chamber 20 serving as the vacuum chamber is connected to the load lock chamber 18 through a gate valve G4, the second arm chamber 20 being connected to a position opposite to the first arm chamber 12. Cassette chambers 26 and 28 serving as the vacuum chambers are respectively connected to the two sides of the second arm chamber 20 through gate valves G5 and G6. To enable the substrates LC to be introduced and discharged to and from the chambers 18, 26 and 28, the second arm chamber 20 includes a conveyance arm 24 which is capable of expanding, contracting and swinging in the horizontal direction. A fork 22 for holding the substrates LC is attached to the leading end of the conveyance arm 24. As a matter of course, a gas supply system for supplying inert gas, such as $N_2$ gas, into the second arm chamber 20 and a gas exhaust system for exhausting gas in the second arm chamber 20 to reduce the pressure level in the second arm chamber 20 are connected to the second arm chamber 20. Each of the cassette chambers 26 and 28 includes a cassette frame (not shown) which is movable vertically. A cassette C which is capable of accommodating a multiplicity of, for example, 20 to 25, substrates LC is placed on the cassette frame. To enable the cassette C to be introduced and discharged between each of the cassette chambers 26 and 28 and the outside, the cassette chambers 26 and 28 are provided with corresponding gate doors GD1 and GD2 which can be opened and closed. As a matter of course, a gas supply system (not shown) for supplying inert gas, such as $N_2$ gas, into the cassette chambers 26 and 28 and a gas exhaust system (not shown) for exhausting gas in the cassette chambers 26 and 28 to reduce the pressure level in the cassette chambers 26 and 28 are connected to the cassette chambers 26 and 28.

When the liquid crystal display substrates LC are subjected to a predetermined process by using the cluster tool apparatus 10 having the above-mentioned structure, the cassette C accommodating a multiplicity of pre-processed liquid crystal display substrates LC is introduced into the cassette chamber 26 from outside through the gate door GD1 in a state where the gate valve G5 is closed. Since the cassette chamber 26 is exposed to the air at this time, the inside vacuum state is broken. Accordingly, gas in the cassette chamber 26, the vacuum state of which has been broken, is exhausted in the state where the cassette C has been introduced into the cassette chamber 26 and the gate door GD1 has been closed, so that the pressure level of the inside portion of the cassette chamber 26 is lowered to a predetermined degree of vacuum. Then, the gate valve G5 is opened, and then the conveyance arm 24 in the second arm chamber 20, the degree of vacuum of which has been maintained to a predetermined level, is operated to convey the liquid crystal display substrates LC on the cassette C from the inside portion of the cassette chamber 26 through the gate valve G5. Then, the liquid crystal display substrates LC are conveyed into the load lock chamber 18 by the conveyance arm 24 through the opened gate valve G4, the load lock chamber 18 having a predetermined degree of vacuum. Thus, the liquid crystal display substrates LC are accommodated on a substrate accommodation rack 50 having a multiplicity of columns disposed in the load lock chamber 18. Note that the substrate accommodation rack 50 is able to accommodate, for example, twenty liquid crystal display substrates LC. The liquid crystal display substrates LC in the substrate accommodation rack 50 are taken by the conveyance arm 15 in the first arm chamber 12, the degree of vacuum of which has been maintained to a predetermined level, through the gate valve G3 to be introduced into the process chambers 14, 16 and 19 through the corresponding gate valves G1, G2 and G7 so that the liquid crystal display substrates LC are subjected to a predetermined process. The processed liquid crystal display substrates LC are allowed to retrograde the above-mentioned route, and then accommodated in the opposite cassette chamber 28 accommodating the processed liquid crystal display substrates LC. That is, the liquid crystal display substrates LC are able to be moved to the process chambers 14, 16 and 19 in a state where the vacuum state of each of the vacuum chambers 12, 18, 20, 26 and 28 is not broken.

For example, the load lock chamber 18 among the vacuum chambers 12, 18, 20, 26 and 28 is mainly composed of six rectangular plates 30A to 30F assembled into a box-like shape having size of about 1 m×1.5 m×0.7 m. Note that each of the plates 30A to 30F is made of, for example, a stainless steel plate or an aluminum plate.

Figure 7:
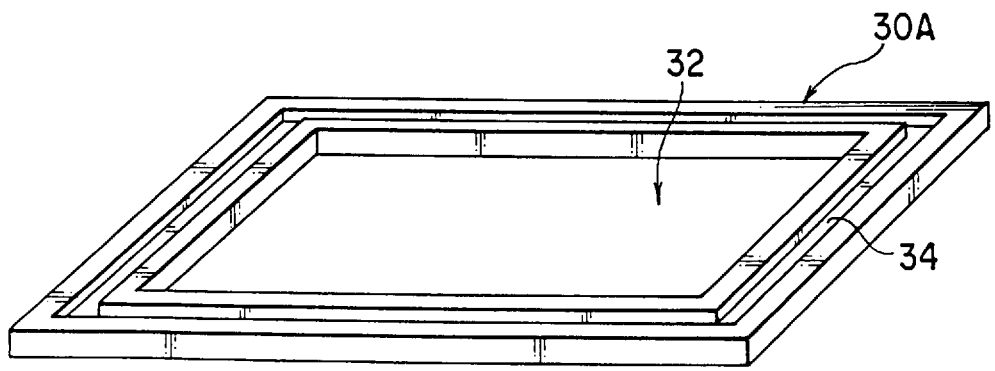
FIG. 7 is a perspective view of a top board forming the load lock chamber shown in FIG. 2.

As shown in FIGS. 2 and 7, a top plate 30A forming the top portion of the load lock chamber 18 has a maintenance opening 32 formed into a rectangular shape. The top plate 30A has, on the upper surface thereof, a seal groove 34 in the form of a recess surrounding the maintenance opening 32. The seal groove 34 has a sealing member 36, such as an O-ring, therein. A top-plate cover 38 for opening and closing the maintenance opening 32 is attached to the top plate 30A through a hinge 40 disposed in an end portion of the top plate 30A. An engaging portion 43 for detachably holding a fixing member 42 of the top-plate cover 38 is formed in another end portion of the top plate 30A. Therefore, when the fixing member 42 is engaged to the engaging portion 43 and the lower surface of the top-plate cover 38 is pressed against the sealing member 36 disposed in the seal groove 34 of the top plate 30A, the maintenance opening 32 is hermetically closed by the top-plate cover 38.

Figure 3:
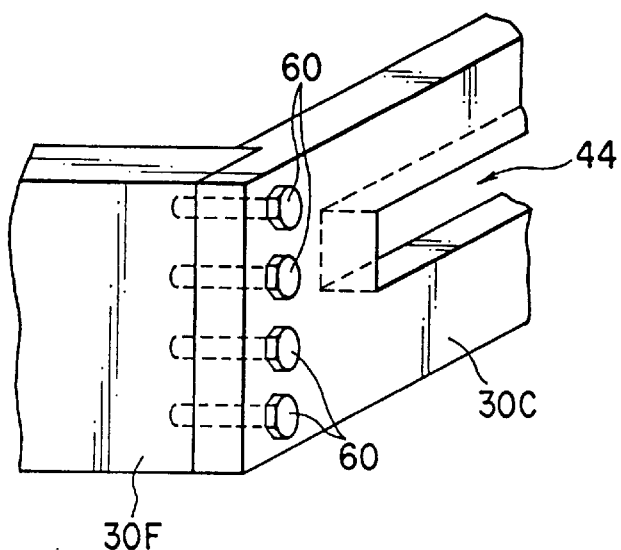
FIG. 3 is a partial perspective view showing a state in which plates forming the load lock chamber shown in FIG. 2 are joined together.
Figure 4:
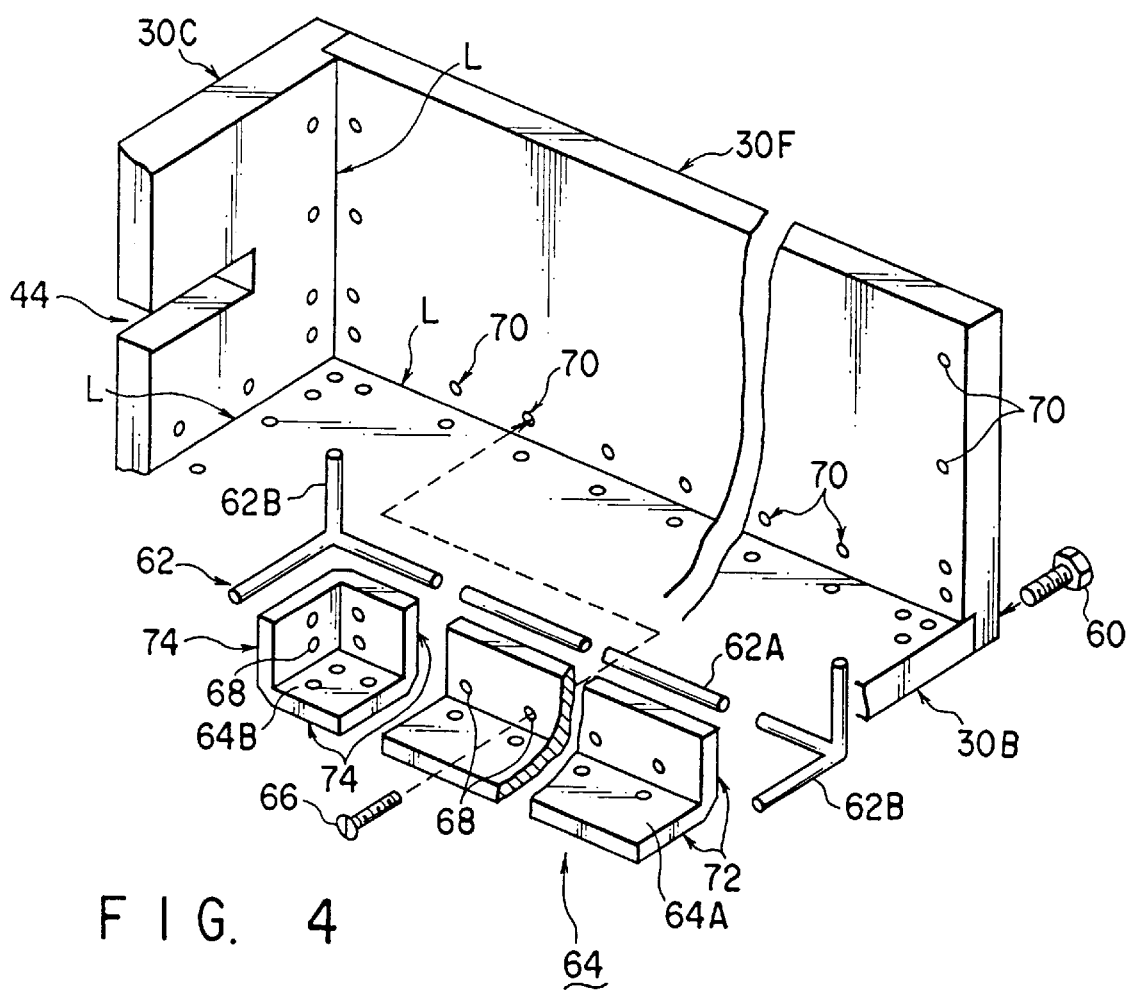
FIG. 4 is an exploded perspective view showing welded portions of the load lock chamber shown in FIG. 2.

A pair of side plates 30C and 30D forming side portions of the load lock chamber 18 have corresponding insertion holes 44 and 46 through which the substrate LC is allowed to pass. Note that FIGS. 2 to 4 illustrate only one insertion hole 44. The gate valves G3 and G4 are connected to the side plates 30C and 30D to open and close the insertion holes 44 and 46. An elevation mechanism 48, through a shaft seal 54, hermetically penetrates a bottom plate 30B forming the bottom of the load lock chamber 18. A retainer frame 52 is attached to the top end of the elevation mechanism 48. A substrate accommodation rack 50, on which a plurality of, for example, twenty liquid crystal display substrates LC are stacked and horizontally placed, is disposed on the retainer frame 52. The substrate accommodation rack 50 is allowed to pass through the maintenance opening 32 so as to be introduced into the load lock chamber 18. A gas supply system 56 for supplying inert gas, such as $N_2$ gas, to the inside portion of the load lock chamber 18 is connected to the load lock chamber 18. Moreover, a gas exhaust system 58 for exhausting gas in the load lock chamber 18 to reduce the pressure level in the load lock chamber 18 is connected to the load lock chamber 18. The plates 30A to 30F forming the load lock chamber 18 are strongly joined together by structure bolts 60. FIG. 3 shows a state where the side plates 30C and 30F are joined together. Since the load lock chamber 18 has a large size of about 1 m×1.5 m×0.7 m as described above, the thickness of each of the plates 30A to 30F forming the load lock chamber 18 is made to be about 20 mm to about 60 mm though it varies in accordance with the material of the plate, deformation tolerance and applied portions. It leads to a fact that the load lock chamber 18 weighs 1 ton or more. In order to maintain the structural strength of the load lock chamber 18, that is, in order to cause the joint portions of the plates 30A to 30F to have satisfactory strength to endure the load of the structure and the atmosphere, a plurality of the structure bolts 60 are embedded at predetermined intervals to penetrate two plates to be joined together (see FIG. 3).

Figure 8:
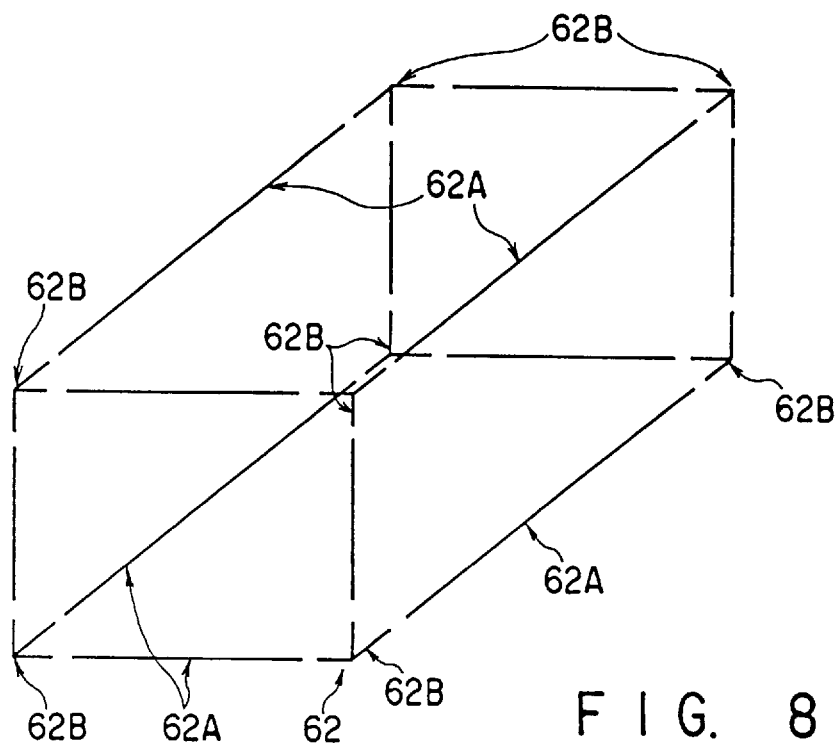
FIG. 8 is a diagram schematically showing configuration of the sealing members.
Figure 9:
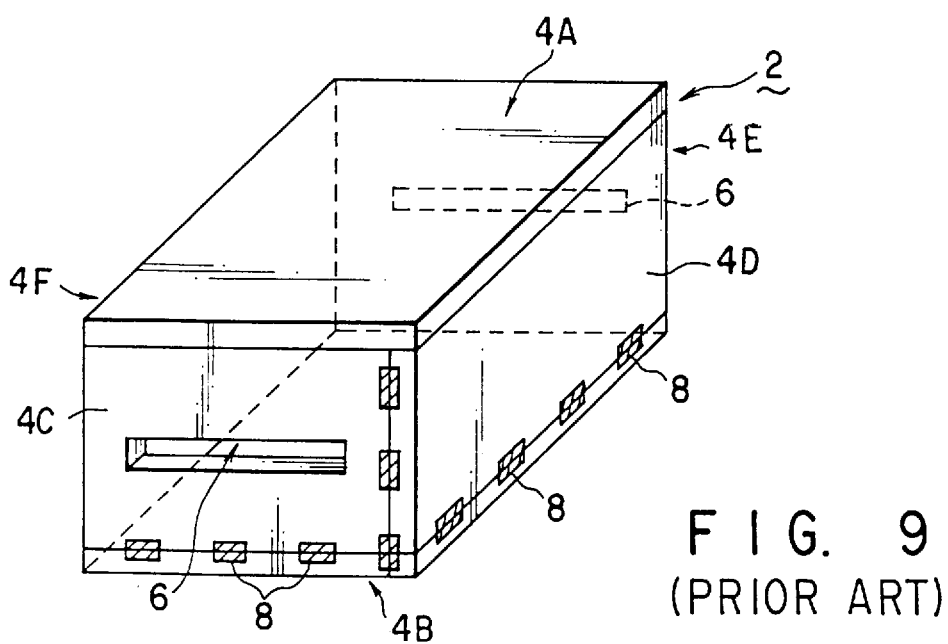
FIG. 9 is a perspective view showing a conventional vacuum chamber.

However, since the structure bolts 60 are employed to maintain the strength of the structure (the load lock chamber 18), the inside portion of the load lock chamber 18 cannot be sealed. Accordingly, a sealing member 62 comprising, for example, an O-ring, is placed along a joint line L on the inner surface of the plates 30A to 30F, as shown in FIG. 4. The sealing member 62 consists of a first sealing portion 62A in the form of a straight disposed along the joint line between the two plates in order to seal the joint portion; and a second sealing portion 62B disposed along joint lines of a joint portion (a corner) of three plates in order to seal the joint portion. In order to seal the joint lines in the three directions along which the three plates are joined together, the second sealing portion 62B has legs extending in the three directions. Since the sealing portions 62A and 62B are continuously disposed along the joint lines on the inside of the plates 30A to 30F, the overall body of the sealing member 62 is formed into a rectangular parallelepiped. This is schematically shown in FIG. 8. In order to prevent breakage of the seal, adjacent sealing portions 62A and 62B are jointed integrally by a vulcanization joining method or with a resin adhesive agent or the like.

Figure 6:
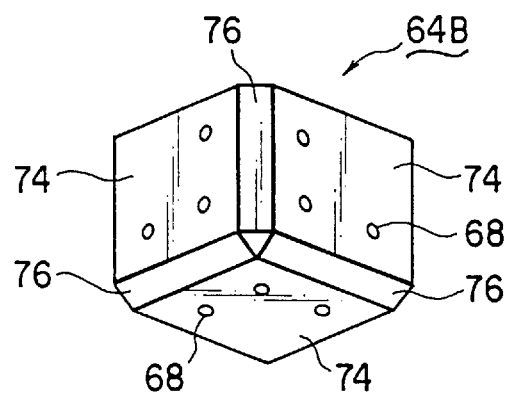
FIG. 6 is a perspective view showing a corner pressing member forming a sealing member.
Figure 10:
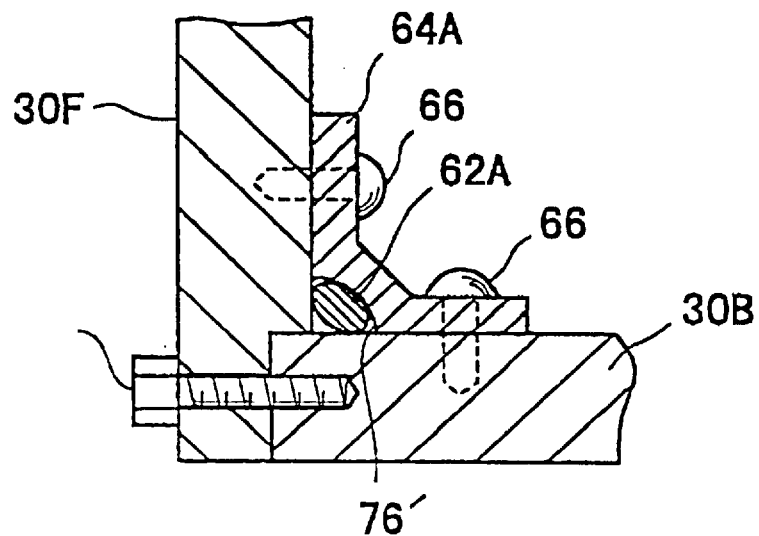
FIG. 10 is an enlarged cross-sectional view showing a joint portion between plates forming the load lock chamber shown in FIG. 2.
Figure 11:
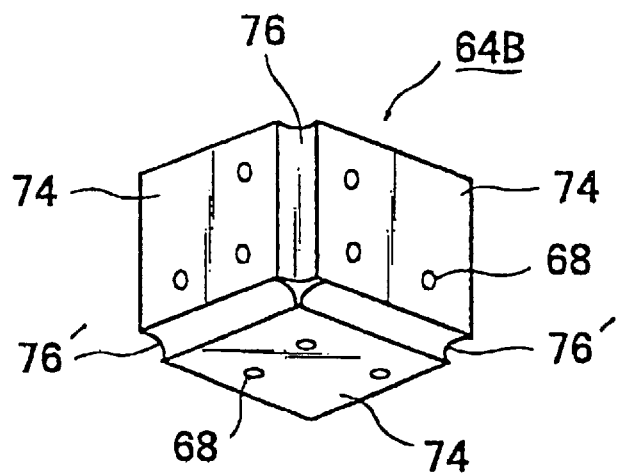
FIG. 11 is a perspective view of FIG. 10 showing a corner pressing member forming a sealing member.

In order to hermetically press the overall bodies of the sealing portions 62A and 62B against the joint portions (against the joint lines L) of the plates 30A to 30F, a holding member 64 is placed on the overall body of the sealing portions 62A and 62B. The holding member 64 consists of a first holding portion 64A for pressing the first sealing portion 62A; and a second holding portion 64B for pressing the second sealing portion 62B. The first holding portion 64A has two attaching surfaces 72 disposed along the two plates, which must be joined together, the attaching surfaces 72 being disposed perpendicular to each other. The second holding portion 64B has three attaching surfaces 74 disposed along the three plates, which must be joined together, the second holding portion 64B being disposed perpendicular to one another. In order to effectively press the sealing portions 62A and 62B, each of boundary portions between the attaching surfaces 72 (74) of each of the holding portions 64A and 64B is formed into a tapered surface 76, or 76' which can be brought into plane contact with the sealing member 62 to press the sealing member 62. FIG. 6 is an enlarged view of the tapered surface 76 of the second holding portion 64B. The tapered surface 76' is formed into a curved shape as shown in FIGS. 10 and 11.

Figure 5:
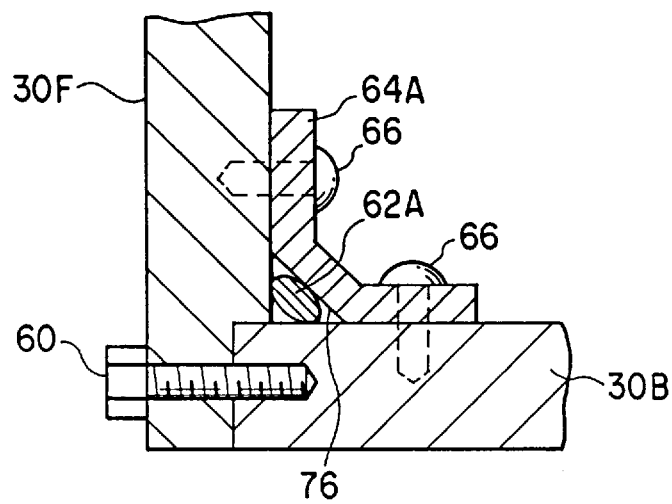
FIG. 5 is an enlarged cross sectional view showing a joint portion between plates forming the load lock chamber shown in FIG. 2.

Each of the attaching surfaces 72 of the first holding portion 64A and each of the attaching surfaces 74 of the second holding portion 64B has bolt holes 68. The joint portions of the plates 30A to 30F has thread holes 70 corresponding to the bolt holes 68. Therefore, when clamping bolts 66 are received by the thread holes 70 through the bolt holes 68, the holding portions 64A and 64B are firmly attached to the joint portions of the plates 30A to 30F. As a result, the sealing portions 62A and 62B are pressed by the holding portions 64A and 64B (in particular, by the tapered surfaces 76) so that the joint portions of the plates 30A to 30F are hermetically sealed by the sealing portions 62A and 62B. The thus-realized state is shown in FIGS. 5 and 10. In order to realize a further satisfactory sealing effect, it is preferable that the holding portions 64A and 64B be continuously disposed in contact with each other to prevent generation of a gap.

A specific process for assembling the load lock chamber 18 will now be described.

Initially, the plates 30A to 30F for forming the load lock chamber 18 are manufactured in a manufacturing plant or the like, and then manufactured plates 30A to 30F are, in this state, moved to a place in which the load lock chamber 18 is used. The conveyed plates 30A to 30F are assembled at the place in which the load lock chamber 18 is used. That is, the plates 30A to 30F are assembled into the box-like shape by the structure bolts 60. In this case, the top plate 30A having the maintenance opening 32 may be assembled finally. Then, while disposing the sealing portions 62A and 62B along the joint line L of each of the plates 30A to 3OF on the inside of the load lock chamber 18, the holding portions 64A and 64B are placed on the sealing portions 62A and 62B, and then the holding portions 64A and 64B are clamped and secured by the clamping bolts 66. When the corners in the load lock chamber 18 are sealed, breakage of seal must be prevented by connecting and integrating the first sealing portion 62A and the second sealing portion 62B to each other by the vulcanization method or with adhesive agent to form the first sealing portion 62A and the second sealing portion 62B into a continuous shape. As a matter of course, incomplete pressing of the sealing portions 62A and 62B must be prevented by adjacently placing the first and second holding portions 64A and 64B while substantially preventing generation of a gap.

After the sealing portions 62A and 62B and the holding portions 64A and 64B have been attached along all of the joint lines L in the load lock chamber 18, the top-plate cover 38 is attached to the top plate 30A. As a result, the load lock chamber 18 can be manufactured.

Although the above-mentioned structure and the assembling method are employed to manufacture the load lock chamber 18, they may be applied to another vacuum chamber (for example, the cassette chambers 26 and 28 and the arm chambers 12 and 20) which is not heated and exposed to corrosive gas. Moreover, the structure according to this embodiment may be applied to a vacuum chamber for processing, for example, semiconductor wafers, as well the vacuum chamber for processing substrates for liquid crystal apparatuses. The diameter of the O-ring serving as the sealing member 62 is determined to be, for example, about 2 mm to about 5 mm. The sealing member 62 may be BYTON (trade name) made of fluorine rubber or a member made of butyl rubber or silicon rubber. The cross sectional shape of the sealing member 62 is not limited to the circular shape but the shape may be a rectangular shape or a cylindrical shape. The holding member 64 may be made of a strong material that cannot easily be corroded. For example, plastic resin, aluminum or stainless steel or the like may be employed. The thickness of the holding member 64 is determined to be about 3 mm to about 7 mm in the case where the load lock chamber 18 has the large size as described above though the thickness is determined in accordance with the size of the vacuum chamber.

As described above, the vacuum chamber (which is not limited to the load lock chamber 18) according to this embodiment has satisfactory strength because the plates 30A to 3OF are assembled into the box-like shape by using the structure bolts 60. Moreover, the sealing member 62 is continuously disposed along the joint lines L on the inside of the plates 30A to 30F by using the holding member 64 so that a satisfactory sealing effect is attained. Therefore, any welding operation is not required as has been required with the conventional structure. In addition, any post-process (a mechanical cutting work to realize a horizontal level) is not required because of thermal deformation can be omitted. As a result, the number of manufacturing steps can be reduced and thus the manufacturing cost can significantly be reduced. Since the corners of the vacuum chamber, which cannot easily hermetically be sealed, are structured such that the second sealing portion 62B having legs extending into three directions are pressed by the second holding portion 64B having the three attaching surfaces 74, a satisfactory sealing effect can be attained. Since the sealing portions 62A and 62B are pressed by the tapered surface 76 of each of the holding portions 64A and 64B, the inside portion can effectively be sealed.

Even if a defective portion or a damaged portion is detected after the vacuum chamber according to this embodiment has been assembled, only a required portion of the plates 30A to 30F can be replaced by removing the structure bolts 60. Therefore, repair can easily be performed. Since only a specific plate can be changed, change of required plates is permitted in a case where the assembled chamber is used in another purpose.

Since any welding operation is not required to assemble the vacuum chamber according to this embodiment, plates made of different materials (for example, an aluminum plate and a stainless steel plate or either of the above-mentioned plates and a honeycomb plate) which cannot easily be welded to each other, can be joined and assembled. Therefore, a structure may be employed in which the bottom plate 30B, which must have significantly large strength, is made of stainless steel and each of the other plates 30A and 30C to 30F is made of aluminum or honeycomb material having light weight in order to reduce the overall weight of the vacuum chamber.

When the vacuum chamber according to this embodiment is assembled, the plates 30A to 30F can be conveyed from a plant for manufacturing the plates 30A to 30F to a place in which the chamber is used in the manufactured state, and the plates 30A to 30F can be assembled at the place in which the chamber is used. Therefore, conveyance can easily be performed and the manufacturing cost can significantly be reduced.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

I claim:

1. A vacuum chamber comprising:

a plurality of plates arranged to be joined together by using bolts to form an internal space;

a sealing member continuously disposed along joint lines on the inside portion of said vacuum chamber facing the internal space in order to seal joint portions among said plates; and pressing members secured to said plates by bolts so as to hermetically press said sealing member against the joint portions among said plates wherein said sealing member has a plurality of first sealing portions, each of which is formed into a straight shape and which are disposed alone the joint lines of two plates for sealing the joint portion between the two plates, and a plurality of second sealing portions disposed alone joint lines of three plates for sealing the joint portions of the three plates, each of said second sealing portions has legs extending into three directions for sealing three-directional joint lines of corner portions of said vacuum chamber in which three plates are joined.

2. A vacuum chamber according to claim 1, wherein adjacent first sealing portion and second sealing portion are integrally joined together.

3. A vacuum chamber according to claim 1, wherein said pressing members consist of a plurality of first pressing portions for pressing said first sealing portions against the joint portions and a plurality of second pressing portions for pressing said second sealing portions against the joint portions.

4. A vacuum chamber according to claim 1, wherein each of said first pressing portions has two attaching surfaces disposed along two plates required to be joined together.

5. A vacuum chamber according to claim 4, wherein a boundary between the two attaching surfaces of each of said first pressing portions is formed into a tapered surface arranged to be brought into plane contact with said first sealing portions so as to press said first sealing portions against the joint portions.

6. A vacuum chamber according to claim 4, wherein each of the two attaching surfaces of each of said first pressing portions has a plurality of bolt holes into which bolts are driven into said plates.

7. A vacuum chamber comprising:

a plurality of plates arranged to be joined together by using bolts to form an internal space;

a sealing member continuously disposed alone joint lines on the inside portion of said vacuum chamber facing the internal space in order to seal joint portions among said plates; and pressing members secured to said plates by bolts so as to hermetically press said sealing member against the joint portions among said plates, wherein said sealing member has a plurality of first sealing portions, each of which is formed into a straight shape and which are disposed along the joint lines of two plates for sealing the joint portion between two plates, and a plurality of second sealing portions disposed along joint lines of three plates for sealing the joint portions of the three plates, each of said second sealing portions has legs extending into three directions for sealing three-directional joint lines of corner portions of said vacuum chamber in which three plates are joined, wherein each of said second pressing portions has three attaching surfaces disposed along three plates, and wherein said pressing members have a plurality of first pressing portions for pressing said first sealing portions against the joint portions and a plurality of second pressing portions for pressing said second sealing portions against the joint portions.

8. A vacuum chamber according to claim 7, wherein each boundary among the three attaching surfaces of each of said second pressing portion is formed into a tapered surface arranged to be brought into plane contact with said second sealing portion so as to press said second sealing portion against the joint portions.

9. A vacuum chamber according to claim 7, wherein each of the three attaching surfaces of each of said second pressing portions has a plurality of bolt holes into which bolts are driven into said plates.

10. A vacuum chamber comprising:

a plurality of plates arranged to be joined together by using bolts to form an internal space;

a sealing member continuously disposed along joint lines on the inside portion of said vacuum chamber facing the internal space in order to seal joint portions among said plates; and pressing members secured to said plates by bolts so as to hermetically press said sealing member against the joint portions among said plates, said pressing members having a plurality of first pressing portions for pressing said first sealing portions against the joint portions and a plurality of second pressing portions for pressing said second sealing portions against the joint portions, wherein adjacent first pressing portions or adjacent first pressing portion and said second pressing portion are disposed while being brought into contact with each other without forming any gap, wherein said sealing member has a plurality of first sealing portions, each of which is formed into a straight shape and which are disposed along the joint lines of two plates for sealing the joint portion between two plates, and a plurality of second sealing portions disposed alone joint lines of three plates for sealing the joint portions of the three plates, and wherein each of said second sealing portions has legs extending into three directions for sealing three-directional joint lines of corner portions of said vacuum chamber in which three plates are joined.

11. A method of manufacturing a vacuum chamber comprising the steps of:

joining a plurality of plates by using bolts to form a chamber having an internal space;

continuously disposing a sealing member along inner joint lines facing the internal space in order to seal joint portions among said plates, at least one of the joint portions being disposed along joint lines of three of said plates; and securing pressing members against said plates by bolts to cause said pressing members to press said sealing member against the joint portions among said plates.

* * * * *